Feb. 20, 1951        F. E. RICE        2,542,431

SOLUBLE FERTILIZER APPLICATOR

Filed July 15, 1948

INVENTOR.
Floyd E. Rice
BY
Scott L. Norviel

Patented Feb. 20, 1951

2,542,431

UNITED STATES PATENT OFFICE 2,542,431

SOLUBLE FERTILIZER APPLICATOR

Floyd E. Rice, Maricopa County, Ariz.

Application July 15, 1948, Serial No. 38,857

4 Claims. (Cl. 47—1)

This invention pertains to soluble fertilizer applicators.

It is intended that this device be used where it is desired to dissolve fertilizing chemicals in irrigation water flowing through a ditch, or the like, onto lands to be irrigated.

One of the objects is to provide a vertically rotatable hopper with driving means actuated by the flow of water through the ditch and with a discharge valve at its bottom adapted to discharge a measured flow of fertilizing chemicals into the water flowing through an irrigating ditch.

Another object is to provide a rotary hopper with a discharge valve in its lower portion positioned above a driving turbine having a circular mixing cell immersed in the ditch water wherein the water is given a rotary motion.

Another object is to provide a mixing cell to receive fertilizer discharged from the valve at the bottom of said hopper, having an open bottom, and adapted to be immersed in a ditch carrying irrigation water, and to be driven by a number of radially extending turbine blades immersed in the water flowing in the irrigation ditch.

Another object is to provide regulating and adjusting means for controlling the position of the hopper and its attending turbine and mixing cell over an irrigation ditch and for regulating the depth of immersion of the mixing chamber and turbine in the water in the ditch;

Still another object is to provide a comparatively cheap and sturdy construction for the whole device including an easy means of adjustment of the fertilizer discharge valve so that a predetermined minimum flow of fertilizer is maintained which is varied, somewhat, relative to the flow of water in the ditch.

Other objects will appear hereinafter.

I attain the foregoing objects by means of the structure and mechanism illustrated in the accompanying drawings, in which—

Figure 1:
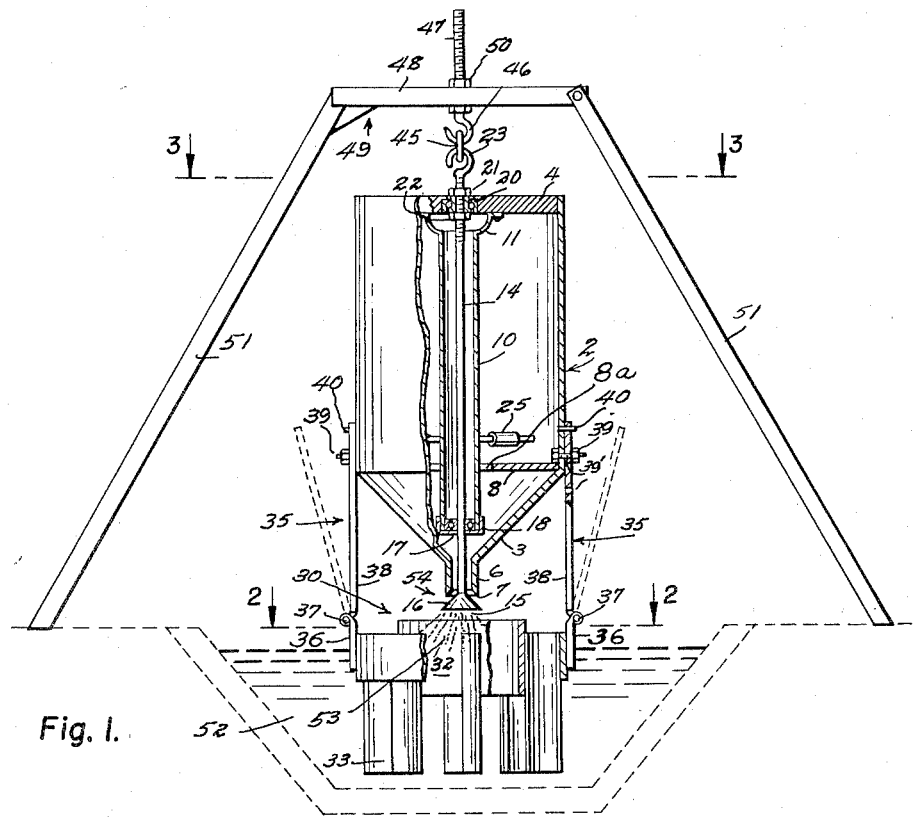
Figure 1 is a side sectional elevation of my applicator, showing its installation over an irrigation ditch.
Figures 2, 3:
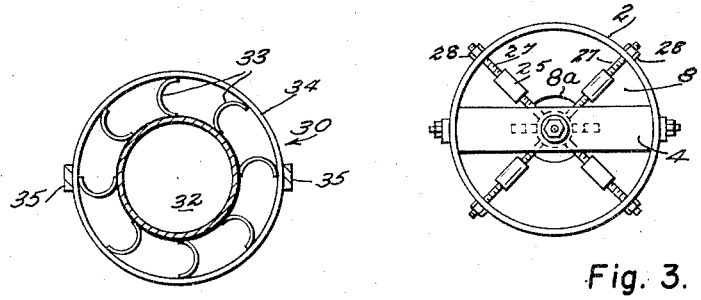
Figure 2 is a plan view of a section taken on line 2—2, Figure 1.

Figure 3, a horizontal sectional view taken on line 3—3, Figure 1.

Similar numerals refer to similar parts in the several views.

The cylindrical hopper 2 has a conical bottom 3 and a supporting cross bar 4 at the top. A nipple 6 is attached to the bottom opening of bottom 3 and its lower end is beveled internally to provide a valve seat 7. At the upper edge of bottom 3 there is a baffle plate 8 centrally perforated at 8a which supports a part of the weight of the fertilizer when the hopper 2 is filled and thus keeps the entire weight off of the valve at the bottom.

A tubular valve rod housing 10 is attached by a flange fitting 11 to the under face of cross bar 4 and extends axially down into the hopper 2 terminating a short distance above the bottom opening of the conical bottom 3.

A valve rod 14 extends axially through this housing. This rod has a valve plug 15 at its lower end with a conical or tapering upper face 16 mating the inner bevel of nipple 6. It is rotatively secured to housing 10 by a ball bearing 17 secured within a shouldered thimble 18 screwed onto the lower end of the housing, and by a ball bearing 20 housed within bar 4 near its upper end. The upper portion of rod 14 is threaded to receive two jam nuts 21 and 22 on the upper and lower faces, respectively, of ball bearing 20. Above this, the rod is drawn out and formed into a supporting hook 23.

In order to accurately position valve plug 15 in the center of nipple 6, I provide four radial positioning and supporting rods 25. Each of these rods has a centrally positioned turnbuckle 26 and the end portions 27 of the rods pass out through the side of the bin and are secured by nuts 29.

The turbine and mixing cell, indicated generally by numeral 30, constitute a unit easily detachable from the hopper 2.

The mixing or dissolving cell 32 is made from a metal cylinder. Semi-circular fins or turbine blades 33 are attached to its outer surface and extend radially outward. A ring 34 joins the upper portion of the outer edges of these blades acting as a reinforcing member and a base for the attachment of the lower portions of hinged connecting bars 35. The lower portions 36 of these bars are welded at opposite diametrical positions to the outside of this ring. Hinges 37 join these lower portions to upper bars 38 forming upper portions which are attached to the outside of the cylindrical part of the hopper 2 by bolts 39 and positioned by pins 40. Several pairs of spaced holes 39' are drilled in bars 38 so that the distance from valve 54 to the top of cell 32 can be varied and adjusted. Hook 23 at the top end of valve rod or shaft 14 engages a link 45 which is, in turn, supported by hook 46 having a threaded shank 47 secured to horizontal beam 48 of tripod 49 by nut 50.

In use the legs 51 of tripod 49 are spanned over ditch 52 so that hook 46 is over the portion of the ditch carrying a suitable current. Usually, the turbine works best when slightly to one side of center of the ditch. Link 45 carrying the upper end hook 23 of shaft 14 is engaged on hook 46 and the entire device supported over the ditch. Nut 50 is adjusted until the turbine-mixing cell unit 30 is submerged to the level shown in Figure 1 with the normal water level just below the top rim of the cell. Assuming that rod 14 is properly centered in nipple 6, it is adjusted axially by screwing jam nuts 21 and 22 up or down, as desired, until the valve opening is set to deliver the fertilizer at the rate desired. Since the rate of flow of fertilizers, through this valve 54, varies with the kind and grade of fertilizer, as well as the rate of rotation of the hopper, these settings are determined in the first place by experiment and timing. Feeler gages are then made to measure the opening between the valve plug and valve seat and settings thereafter made according to gage. The hopper 2 is then filled with fertilizer and when released, the hopper rotates slowly, according to the velocity of water flow in the ditch, and fertilizer is discharged in a conical flow 53 from the valve 54. The rod 14 and valve plug 15 remain stationary. The relative motion, between the valve plug, rod 14 and sleeve 6 work the fertilizer particles as they descend through the sleeve and maintain the flow uniform. The baffle plate 8 is perforated sufficiently so there is free flow of fertilizer from the upper part of the hopper down into the conical bottom portion.

As the fertilizer drops into the ditch water within cell 32, it is swirled by the rotary motion imparted by the walls of the cell. This action starts dissolving the particles, and as they sink into the ditch water below the lower rim of the cell wall, they are carried away with the flow of the water in the ditch and are quickly and completely dissolved.

Having now fully described my invention and explained its use, I wish to be limited only by the claims.

I claim:

1. A fertilizer applicator for dissolving fertilizer chemicals in water flowing in an irrigation ditch, comprising, a cylindrical hopper having a conical bottom, a circular valve seat at the bottom thereof, a stationary valve plug rod extending axially through said hopper journalled relative thereto, having means for non-rotary suspension at its top end and a conical valve plug at its lower end, a cylindrical open-bottomed mixing cell attached to said hopper and positioned below said valve plug, adapted to immersion in water flowing in an irrigation ditch, and a turbine surrounding and depending from the exterior of said cell adapted to derive rotary motion from water flowing in said irrigation ditch to rotate said cell and said hopper.

2. A fertilizer applicator for dissolving soluble fertilizers in water flowing in an irrigation ditch, comprising in combination, a hopper, a valve seat formed in the bottom thereof, a supporting bar across the top of said hopper and a centrally positioned sleeve extending from said bar toward the bottom of said hopper, a valve rod journalled axially in said sleeve having a valve plug at the bottom cooperative with said valve seat and a supporting hook at the top; a mixing cell attached to and supported by said hopper so that it is positioned below said valve seat, and having radial turbine fins adapted for immersion in water flowing in an irrigation ditch; said turbine fins being adapted to impart rotary motion to said mixing cell and said hopper when supported on said valve rod.

3. A fertilizer applicator for dissolving soluble fertilizers in water flowing in an irrigation ditch, comprising in combination, a tripod frame adapted to span an irrigation ditch having a cross-member at the top with a depending hook having a threaded shank axially adjustable therein; a hopper having a converging bottom terminating in a valve seat, an intermediate perforated baffle, and a supporting bar extending across its top, a bearing centrally positioned therein, a sleeve extending centrally within said hopper from said cross bar to a position near said hopper bottom, positioning rods extending radially from the lower portion of said sleeve to the walls of said hopper, a bearing in the lower portion of said sleeve; a valve plug rod having a hook at its upper end supported by said hook on said frame and a valve plug at its lower end cooperative with said valve seat extending centrally through said sleeve journalled in said cross bar, bearing and said sleeve bearing to have axial adjustment relative to said hopper; a cylindrical mixing cell removably attached to the lower portion of said hopper and centrally positioned below said valve seat; turbine fins attached to said cell and extending radially therefrom adapted to impart rotary motion to said cell and said hopper when immersed in water flowing in an irrigation ditch.

4. In a fertilizer applicator for dissolving soluble fertilizers in water flowing in an irrigation ditch, a cylindrical hopper having a conical bottom terminating in a tube having a valve seat, a diametrically disposed supporting bar at the top thereof, a support bearing axially positioned therein, a sleeve axially depending therefrom, and having a bearing at its bottom end, means for supporting said hopper over an irrigation ditch including a tripod, a longitudinally adjustable hook at the top thereof, and a vertical shaft engaged therein extending axially through said hopper and sleeve, journalled in the bearings in said supporting bar and sleeve, extending through said tube at the bottom of said hopper and carrying a valve plug at its lower end having a conical upper surface cooperative with the valve seat on said tube, and means for regulating said plug relative to said seat including threads formed on the upper end of said shaft adjacent the portion journalled in said supporting bar, and nuts threaded above and below said bearing adapted to hold said shaft and the valve plug carried thereon in varied axial relation to the valve seat on said tube.

FLOYD E. RICE.

REFERENCES CITED

The following references are of record in the file of this patent:

UNITED STATES PATENTS

| Number | Name | Date |
| --- | --- | --- |
| 1,173,534 | Ryan | Feb. 29, 1916 |
| 1,862,238 | Roe | June 7, 1932 |
| 1,882,911 | Richards | Oct. 18, 1932 |
| 1,910,235 | Burkett | May 23, 1933 |